April 16, 1935.  B. S. AIKMAN  1,998,265
COMPRESSOR CONTROL MECHANISM
Filed Dec. 21, 1933
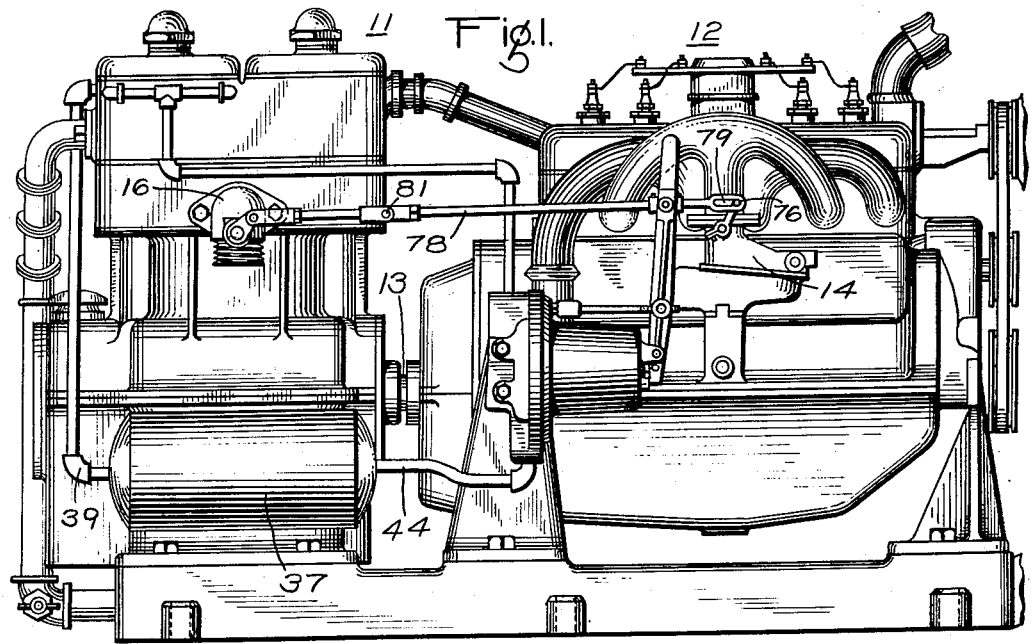
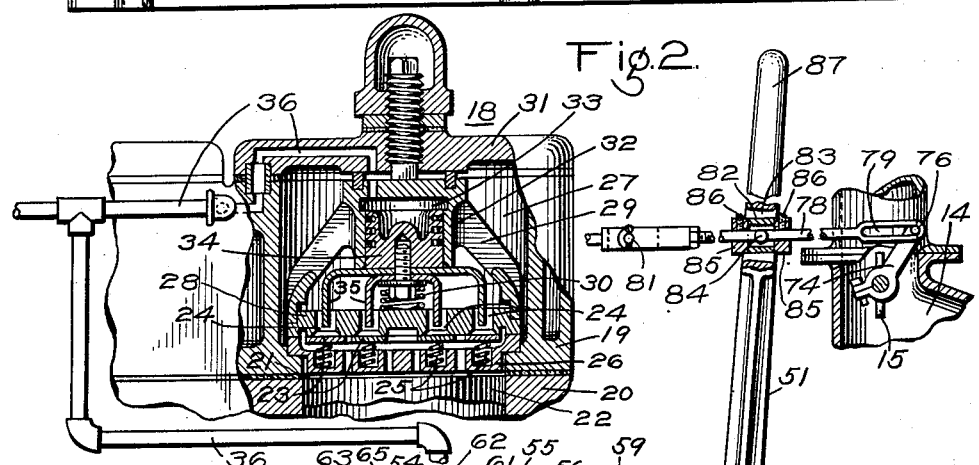
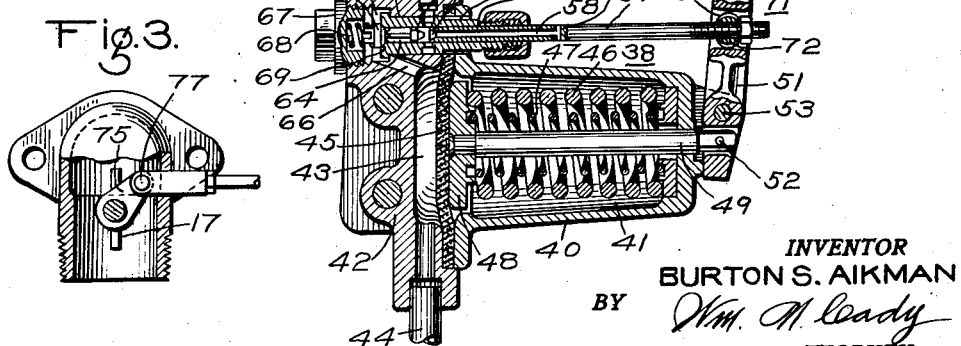
INVENTOR
BURTON S. AIKMAN
BY *Wm. M. Cady*
ATTORNEY Patented Apr. 16, 1935

1,998,265

UNITED STATES PATENT OFFICE 1,998,265

COMPRESSOR CONTROL MECHANISM

Burton S. Aikman, Wilkinsburg, Pa., assignor to The Westinghouse Air Brake Company, Wilmerding, Pa., a corporation of Pennsylvania Application December 21, 1933, Serial No. 703,415

13 Claims. (Cl. 230—3)

This invention relates to fluid compressors and particularly to the control mechanism for motor driven compressors of the portable type wherein the storage or main reservoir for the compressed fluid is of limited capacity.

Compressors of the portable type such as are mounted on wheeled trucks are usually self-contained units driven by an internal combustion engine, the usual practice being to provide the compressor with an unloader adapted to unload the compressor by any preferred means and to throttle the fuel supply to the engine when the pressure of the fluid compressed by the compressor exceeds a predetermined value, so that when the quantity of fluid compressed exceeds the demand, the compressor is unloaded and remains unloaded while the engine idles at low speed until the fluid pressure in the main reservoir falls below a predetermined value.

Such operation is satisfactory where a large storage tank is employed, but in the case of a portable compressor unit, the capacity of the storage tank or reservoir is limited so that the compressor is constantly being loaded and unloaded and the engine throttled at frequent intervals. The compressor thus must work at maximum volumetric efficiency and the engine must work at maximum pressure speed for short intervals of time and then be slowed down and unloaded at short intervals, thus materially reducing the efficiency of the unit and increasing wear on both the compressor and the engine due to the frequently recurring accelerating and decelerating phases of the operating cycle.

Inefficient as this mode of operation is, it has been found more desirable than throttling the engine so as to reduce the speed of the compressor for reducing the rate of compression of the fluid, because at low speeds the engine is operating at less than maximum efficiency while the compressor is still operating at maximum volumetric efficiency, thus imposing a load out of proportion to the reduction in power output of the engines so that the engine labors ineffectively at the reduced speed and causes a greater loss of efficiency than the method of operation above described.

It is an object of this invention to provide a fluid compressor wherein the volumetric efficiency of the compressor is automatically reduced substantially in proportion to the reduction in power output of the engine when the quantity of fluid compressed exceeds the demand, so that the engine is not overloaded when operating at reduced speeds and so that the compressor may economically compress at such times, sufficient fluid to supply the demands. Means are provided for automatically increasing the power output of the engine and for increasing the volumetric efficiency of the compressor as the demand for compressed fluid increases. More efficient operation is effected because the operation is continuous and at slightly varied speeds, the average speed of operation being well under the maximum speed maintained while the usual compressor is increasing the supply of compressed fluid so that it equals or exceeds the demand.

A further object of the invention is to provide a compressor unit operating in the manner above described wherein means are provided for automatically unloading the compressor and idling the engine when the fluid demand falls below such value that the compressor, in order to supply the demand, would ordinarily operate at a rate of speed too slow for economic operation of the engine.

A further object of the invention is to provide a compressor unit having the above noted characteristics wherein means are provided for manually operating the throttle of the engine and the valve for controlling the volumetric efficiency of the compressor when desired, as when the engine is idle and the main reservoir pressure is so reduced that the throttle is moved to full speed position, thereby rendering it possible to throttle the engine before starting, to prevent racing thereof with the unloaded compressor.

These and other objects of the invention that will be made apparent throughout the further description thereof are attained by means of the compressor unit hereinafter described and illustrated in the accompanying drawing, wherein Fig. 1 is an elevational view of a compressor unit embodying features of the invention;

Fig. 2 is a fragmental sectional view partly in elevation showing the combined inlet and unloader valve mechanism and fluid pressure actuated control mechanism for the compressor and the engine; and Fig. 3 is a sectional view of the inlet control valve of the compressor.

Referring to the drawing the compressor unit comprises a fluid compressor 11 and an internal combustion engine 12 for driving the compressor, the crankshaft 13 of the compressor being directly connected to the crankshaft of the engine. The internal combustion engine is provided with the usual carburetor device 14 having an air inlet butterfly or throttle valve 15 of the usual type, which when closed, limits the supply of operating fluid or fuel to the engine and when in open position permits a maximum supply of fuel to be delivered to the engine in order to obtain maximum power output thereof.

The compressor 11 is provided with an intake chamber 16 which is provided with an air controlling inlet valve 17 of the butterfly type which when closed or partially closed limits the supply of air to the compressor and therefore reduces the volumetric efficiency of the compressor by reducing the supply of air supplied thereto upon the intake stroke of the piston of the compressor. The compressor is also provided with a combined unloader and inlet valve device 18 shown particularly in Fig. 2 and which comprises a head casing 19 that is mounted upon the cylinder casing 20 containing the compression chamber 21 in which the piston 22 of the compressor reciprocates.

The inlet valve of the compressor comprises a pair of annular discs 23 that are yieldingly held upon their respective seats for closing the inlet port 24 by springs 25 which are seated upon a spring retainer disc 26 that is mounted in the head casing 19. Upon the downward stroke of the piston 22, the valve discs 23 are forced to open position by the greater pressure in the inlet chamber 27, so that fluid flows from the inlet chamber into the compression chamber 21 through the ports 24. Upon the upward stroke of the piston, the fluid within the compression chamber 21 is compressed, the valve discs 23 preventing a reflux of the fluid into the inlet chamber 27.

The disc 28 containing the ports 24 is retained in the inlet chamber 27 by means of a spider or cage 29 that is held in place by means of the cover or closure 31 for the inlet chamber 27 as indicated in Fig. 2. The cage 29 is provided with a cylinder 32 having a piston chamber 33 containing a piston 34 which carries a plurality of depending fingers 35 which extend through the inlet ports 24 and engage the inlet valve discs 23 and force them from their closed position when the piston 34 is moved downwardly against the action of the spring 30 which normally tends to hold the piston and the fingers 35 in their uppermost position as shown in Fig. 2.

The piston is adapted to be moved to a lower or unloading position wherein the inlet valve discs 23 are held in open position by the fingers 35 for preventing compression of the fluid within the compression chamber, by fluid under pressure within the piston chamber 33 supplied thereto through a passage and pipe 36 which is supplied with fluid from the main reservoir 37 in a manner to be hereinafter described.

A fluid actuated control mechanism 38 is provided for controlling the operation of the fuel inlet valve 15, air inlet valve 17 and unloader mechanism, in response to variations in the pressure of the fluid compressed by the compressor and stored in the main reservoir 37, it being understood that the fluid compressed by the compressor is conducted to the main reservoir through the pipe 39 shown in Fig. 1.

The control mechanism 38 comprises a casing 40 having a spring chamber 41, and a casing 42 having a fluid chamber 43 that is connected to the main reservoir 37 by a pipe 44. A flexible diaphragm 45 is clamped between the casing sections 42 and 40 so that it closes the chamber 43 and is subject to the pressure of fluid within the chamber supplied thereto from the main reservoir. The spring chamber 41 contains a pair of springs 46 and 47 which engage a follower 48 carried by the diaphragm 45 and which are adapted to yieldingly oppose movement of the follower and diaphragm to the right. The follower 48 is provided with an operating stem 49 which projects exteriorly of the casing 40 and which is pivotally connected to an operating lever 51 by means of a pin 52. The lever 51 is pivoted to the casing 40 by a pin 53 so that as the stem 49 is moved to the right against the action of the springs 46 and 47, the operating lever 51 is rotated in a counter-clockwise direction.

The casing section 42 is provided with a bore 54 containing a valve seat bushing 55 having a bore 56 in which an operating rod 57 may reciprocate, the rod being provided with a passage 58 that is open to the atmosphere through ports 59, the inner end of the rod being provided with a valve seat 61 that is adapted to be closed by a valve 62 that is connected to a valve 63 by means of a fluted stem 64 that is guided in the bore 56 in bushing 55. The bore 54 is provided with an enlarged portion constituting a valve chamber 65 which is open to the fluid chamber 43 through a passage 66 and which is adapted to be closed by a threaded closure 67 that is threaded into the casing section 42. A spring 68 serves to yieldingly retain the valve 63 seated upon a valve seat 69 in the inner end of the bushing 55. The rod 57 is pivoted to the lever 51 by a pivot connection 71 which is adapted to impart straight line reciprocating motion to the shaft 57 when the operating lever 51 is oscillated about the pin 53, the connection comprising a trunnion shaft 72 through which the rod 57 is threaded, and which, is guided in an oval or oblong slot 73 in the operating lever 51.

The fuel inlet valve 15 and the air inlet valve 17 are provided with operating arms 74 and 75, respectively, that are pivotally connected by means of pivot pins 76 and 77, respectively, to an operating or connecting rod 78, the pin 76 having a lost motion connection to the rod 78 by means of the elongated slot 79. The connecting rod 78 is articulated and is provided with a joint 81 to permit of slight angular movement of the rod sections and the rod 78 is pivotally connected to the operating lever 51 by means of a trunnion block 82 that is mounted in a slot 83 in the operating lever 51 and which turns upon trunnion shafts 84 pivotally mounted in the lever 51. The rod 78 is fixed to the block 82 by means of adjustable collars 85 that are adapted to be fixed to the connecting rod 78 by means of set screws 86. The lever 51 is provided with a handle portion 87 which may be gripped by the hand of the operator for manually effecting closing movement of the throttle valve 15 when it is desired to start the engine.

In operation, assuming the compressor to be at rest and that the fluid is at atmospheric pressure in the main reservoir 37, the springs 46 and 47 retain the follower 48 and stem 49 in the left position shown in Fig. 2, wherein the operating lever 51 is held in the throttle and inlet valve open position. With the lever 51 in the position shown in Fig. 2, the valve 62 is unseated and the piston chamber 33 of the unloader device is open to the atmosphere through passage and pipe 36, past the open valve 62, passage 58 and atmospheric ports 59. With the piston chamber 33 open to the atmosphere, the spring 30 holds the piston 34 and the fingers 35 in their uppermost position.

Just before the engine is started in the usual manner, as by energizing the ignition circuit and by operating the self-starter, not shown, the operator moves the lever 51 in a counterclockwise direction, thereby causing the fuel inlet valve or throttle 15 and the air inlet valve 17 to be moved toward closed position so as to limit the supply of fuel supplied to the engine and the air which may pass to the compression chamber 21, thus preventing the engine from attaining excessive speed during the starting operation and reducing the volumetric efficiency of the compressor while the engine is building up speed. After the engine has started and is building up speed, the operator may release the operating lever. As the pressure in the main reservoir is built up gradually, the load on the compressor builds up correspondingly. When the quantity of fluid compressed by the compressor exceeds the demand for compressed fluid, the pressure within the main reservoir builds up until the pressure within the chamber 42 of the control device 38 acting on the flexible diaphragm 45 is sufficient to overcome the tension of the springs 46 and 47, at which time the follower 48 and stem 49 are moved to the right, thus turning the operating lever 51 in a counterclockwise direction so as to move the throttle valve 15 and air inlet valve 17 toward closed position and to thereby reduce the amount of fuel supplied to the engine and the volumetric efficiency of the compressor corresponding substantially to the reduction in power output of the engine. The tension of the springs 46 and 47 is so adjusted or selected that the valves 15 and 17 respond to the variations in the pressure of the fluid in the main reservoir so that the engine is operated at a speed sufficient to supply the demand for compressed fluid. Since the volumetric efficiency of the compressor is varied substantially in proportion to the power output of the engine, the engine is not overloaded during operation of the compressor within a certain range of speed. Therefore, maximum efficiency is attained from the compressor unit which includes the compressor and the engine.

In the event that the demand for compressed fluid falls below a predetermined value which would require an exceedingly low speed, at which, the engine cannot operate efficiently, the pressure within the main reservoir 37 and the chamber 43 increases to a point where the operating lever 51 is turned in a counterclockwise direction to its extreme left position so that the valve seat 61 on the rod 57 engages the valve 62 and closes communication from the unloader piston chamber to the atmosphere in the manner above described, and moves the valve 63 from its seat 69 so that fluid under pressure may flow from the main reservoir 37 to the unloader piston chamber 33 through pipe 44, chamber 43, passage 66, valve chamber 65, past the open valve 63, bore 56, and pipe and passage 36. The fluid at main reservoir pressure acting on the upper face of the piston 34 moves the piston and the fingers 35 downwardly so that the inlet valve discs 23 are unseated and held unseated so long as sufficient pressure is maintained on the upper side of the piston to overcome the tension of the springs 25, or until the pressure has reduced sufficiently in the main reservoir to permit the springs 46 and 47 to move the follower 48 and stem 49 to the left a sufficient distance to cause opening movement of the valve 62 and closing movement of the valve 63 so that fluid can no longer flow from the main reservoir to the chamber 33 and so that the fluid within the chamber 33 may be vented to atmosphere in the manner described.

It is apparent from the foregoing that a compressor control device is provided wherein the volumetric efficiency of the compressor and the power output of the motor are varied concurrently in accordance with the demand for fluid compressed by the compressor so that maximum efficiency of operation of the compressor unit is attained throughout a considerable range of operating speeds of the internal combustion engine. When the demand for fluid compressed by the compressor falls below a predetermined value the compressor is unloaded so that the engine speed may be reduced to idling speed during such operation. When the demand for fluid compressed by the compressor is increased so that the main reservoir pressure falls blow a predetermined value, the compressor is again loaded and the speed of operation of the motor is then controlled by the pressure of the fluid within the main reservoir to operate at a speed sufficient to supply efficiently the quantity of compressed fluid demanded.

While but one embodiment of the invention is herein disclosed, it is obvious that omissions and additions and other changes may be made in the construction without departing from the spirit of the invention.

Having now described my invention, what I claim as new and desire to secure by Letters Patent, is:

1. The combination with a fluid compressor having a fluid intake and a valve for controlling said intake for varying the volumetric efficiency of said compressor and an internal combustion engine having a fuel intake and a valve for controlling said fuel intake for varying the power output of said engine, of a means connecting said valves so that they may be actuated to concurrently vary the power output of the engine and the volumetric efficiency of the compressor, and means responsive to variations in the pressure of the fluid compressed by said compressor for actuating said connecting means.

2. The combination with a fluid compressor having a fluid intake and a valve for controlling said intake for varying the volumetric efficiency of said compressor and an internal combustion engine having a fuel intake and a valve for controlling said fuel intake for varying the power output of said engine, of a means connecting said valves so that they may be actuated to concurrently vary the power output of the engine and the volumetric efficiency of the compressor, means responsive to variations in the pressure of the fluid compressed by said compressor for actuating said connecting means, and means actuated by said pressure responsive means for effecting the unloading of said compressor when the pressure of the fluid compressed thereby exceeds a predetermined value.

3. The combination with a fluid compressor having a fluid intake and a valve for controlling said intake for varying the volumetric efficiency of said compressor and an internal combustion engine having a fuel intake and a valve for controlling said fuel intake for varying the power output of said engine, of a means connecting said valves so that they may be actuated to concurrently vary the power output of the engine and the volumetric efficiency of the compressor, means responsive to variations of the fluid compressed by said compressor for actuating said connecting means, and a manually operable means for actuating said connecting means.

4. The combination with a compressor having an air intake, a valve for controlling said intake for varying the volumetric efficiency of said compressor, and an unloader, of a means actuated by the pressure of the fluid compressed by the compressor adapted, when said pressure is increased, to first move said valve to reduce the volumetric efficiency of the compressor and then cause actuation of said unloader to unloading condition.

5. The combination with a compressor having an air intake, a valve for controlling said intake for varying the volumetric efficiency of said compressor, an unloader actuated by fluid compressed by the compressor and a valve for controlling the supply of actuating fluid to said unloader, of a means actuated by fluid under pressure compressed by said compressor for moving said valves when the pressure of said fluid exceeds a predetermined value.

6. The combination with a compressor having an air intake, a valve for controlling said intake for varying the volumetric efficiency of said compressor, an unloader actuated by fluid compressed by the compressor, a valve for controlling the supply of actuating fluid to said unloader, an internal combustion engine for driving said compressor and having a valve means for controlling the power output of said engine, of a means actuated by fluid under pressure compressed by said compressor for actuating said intake valve, supply controlling valve and valve means when the pressure of said fluid exceeds a predetermined value.

7. The combination with a fluid compressor, a motor for driving said compressor, valve means for controlling the supply of fluid to the compressor to vary the volumetric efficiency of the compressor, and means for regulating the power output of said motor, of means operably responsive to the pressure of fluid compressed by the compressor for concurrently actuating said valve means and said regulating means.

8. The combination with a fluid compressor, a motor for driving said compressor, valve means for controlling the supply of fluid to the compressor to vary the volumetric efficiency of the compressor, and means for regulating the power output of said motor, of means operably responsive to the pressure of fluid compressed by the compressor for concurrently actuating said valve means and said regulating means, and unloading means for said compressor, the operation of which to unload the compressor is effected by said pressure responsive means when the pressure of fluid compressed by the compressor exceeds a predetermined value.

9. The combination with a fluid compressor, a motor for driving said compressor, valve means for controlling the supply of fluid to the compressor to vary the volumetric efficiency of the compressor, and means for regulating the power output of said motor, of means operably responsive to the pressure of fluid compressed by the compressor for actuating said regulating means and for concurrently actuating said valve means in accordance with the actuation of said regulating means.

10. The combination with a fluid compressor, a motor for driving said compressor, a storage reservoir for receiving fluid compressed by said compressor, valve means for regulating the supply of fluid to the compressor to vary the volumetric efficiency of the compressor, and means for regulating the power output of said motor, of means operably responsive to the pressure of fluid in said reservoir and operated to actuate said regulating means to effect a decrease in the power output of said motor when the pressure of the fluid in said reservoir exceeds a predetermined value, said pressure responsive means also operating to actuate said valve means to effect a decrease in the volumetric efficiency of said compressor in accordance with the decrease in power output of said motor.

11. The combination with a fluid compressor, an internal combustion engine for driving said compressor, valve means for regulating the supply of fluid to the compressor to vary the volumetric efficiency of the compressor, and a carburetor device having a throttle valve for controlling the supply of fuel to said engine to vary the power output of said engine, of means operably responsive to the pressure of fluid compressed by the compressor for concurrently actuating said valve means and said throttle valve.

12. The combination with a fluid compressor, an internal combustion engine for driving said compressor, valve means for regulating the supply of fluid to the compressor to vary the volumetric efficiency of the compressor, and a carburetor device having a throttle valve for controlling the supply of fuel to said engine to vary the power output of said engine, of means operably responsive to the pressure of fluid compressed by the compressor for concurrently actuating said valve means and said throttle valve, and unloading means for said compressor, the operation of which to unload the compressor is effected by said pressure responsive means when the pressure of fluid compressed by the compressor exceeds a predetermined value.

13. The combination with a fluid compressor, a valve for controlling the supply of fluid to said compressor to vary the volumetric efficiency of said compressor, an unloading means having fluid pressure responsive means for effecting unloading of the compressor, valve means adapted to control a communication through which fluid under pressure compressed by the compressor is supplied to said fluid pressure responsive means of said unloading means, and a movable abutment subject to the pressure of the fluid compressed by the compressor and operably responsive to a predetermined value of such pressure for effecting the movement of said valve to decrease the volumetric efficiency of said compressor, said movable abutment also being operably responsive to a second predetermined value of the pressure of compressed fluid greater than said first predetermined value thereof, for effecting movement of said valve means to open the communication controlled thereby and permit fluid compressed by said compressor to move said fluid pressure responsive means to effect unloading of said compressor.

BURTON S. AIKMAN.